US012800389B2

(12) United States Patent
Uusimaa et al.

(10) Patent No.: US 12,800,389 B2
(45) Date of Patent: Nov. 17, 2026

(54) APPARATUS AND A METHOD FOR FLUORESCENCE IMAGING

(71) Applicant: Modulight Corporation, Tampere (FI)

(72) Inventors: Petteri Uusimaa, Tampere (FI); Anna Filipchuk, Tampere (FI); Kostiantyn Nechay, Tampere (FI); Robert Perttilä, Tampere (FI)

(73) Assignee: Modulight Corporation, Tampere (FI)

( * ) Notice: Subject to any disclaimer, the term of this patent is extended or adjusted under 35 U.S.C. 154(b) by 79 days.

(21) Appl. No.: 17/970,699

(22) Filed: Oct. 21, 2022

(65) Prior Publication Data

US 2023/0221178 A1 Jul. 13, 2023

Related U.S. Application Data

(63) Continuation-in-part of application No. 17/573,404, filed on Jan. 11, 2022, now Pat. No. 12,449,360.

(51) Int. Cl.
*G01J 3/02* (2006.01)
*G01N 21/64* (2006.01)

(52) U.S. Cl.
CPC ........ *G01J 3/0208* (2013.01); *G01N 21/6456* (2013.01)

(58) Field of Classification Search
None
See application file for complete search history.

(56) References Cited

U.S. PATENT DOCUMENTS 837,860 A 12/1906 Joseph et al.
5,117,466 A * 5/1992 Buican ............... G01N 21/6458 356/417
5,296,703 A * 3/1994 Tsien ..................... H04N 1/053 359/368
5,606,170 A * 2/1997 Saaski ................ G01N 21/7703 250/227.14
5,671,303 A * 9/1997 Shieh ................. G01N 21/6454 385/12
5,760,900 A * 6/1998 Ito ...................... G01N 15/1434 356/73
6,067,157 A * 5/2000 Altendorf ............ G01N 15/147 356/337

(Continued)

FOREIGN PATENT DOCUMENTS

CN 111141713 A * 5/2020 ............ G01N 21/64
CN 111380848 A 7/2020
WO 2021183967 A1 9/2021

OTHER PUBLICATIONS

Hagen et al., "Review of snapshot spectral imaging technologies";Optical Engineering 52(9), 090901 (Sep. 2013) (Year: 2013).*

(Continued)

*Primary Examiner* — Uzma Alam
*Assistant Examiner* — Djura Malevic
(74) *Attorney, Agent, or Firm* — Ziegler IP Law Group, LLC.

(57) ABSTRACT

A hyperspectral detection approach is used in combination with narrow linewidth illumination for fluorescence excitation. A more efficient fluorophores excitation and image capturing may be provided, and thus high-quality data for subsequent hyperspectral analysis may be obtained. An apparatus, a method, a system and a computer program are disclosed.

18 Claims, 2 Drawing Sheets

(56) References Cited

U.S. PATENT DOCUMENTS 6,399,935 B1 * 6/2002 Jovin .................. G02B 21/004 359/385
7,411,682 B2 * 8/2008 Moshe ..................... G01J 3/02 356/452
7,447,391 B2 * 11/2008 Peled .................. G01N 21/774 385/12
7,460,248 B2 * 12/2008 Kurtz ................ G01N 21/6458 356/497
7,835,002 B2 * 11/2010 Muhammed .......... G01J 3/0294 356/418
8,233,148 B2 * 7/2012 Bodkin ................ G01J 3/0235 356/328
8,373,860 B2 * 2/2013 Kiesel ................. G01N 21/255 356/417
8,385,648 B2 * 2/2013 Finlayson ................ G06T 7/90 382/173
8,406,469 B2 * 3/2013 Fisher .............. G06F 18/21342 356/302
8,611,660 B2 * 12/2013 Finlayson ............. G06V 10/60 382/173
8,629,413 B2 * 1/2014 Betzig ............... G01N 21/6458 250/578.1
8,723,140 B2 * 5/2014 Kiesel ............... G01N 21/6408 250/458.1
8,743,201 B2 * 6/2014 Huang ..................... H04N 7/18 356/419
8,830,451 B1 * 9/2014 Graves .............. G01N 15/1459 356/73
9,029,800 B2 * 5/2015 Kiesel ............... G01N 15/1459 250/458.1
9,273,949 B2 3/2016 Bornhop et al.
9,366,573 B2 * 6/2016 Geelen .................. G01J 3/2803
9,772,229 B2 * 9/2017 Geelen .................. G01J 3/0259
9,797,836 B1 * 10/2017 Sinclair ................ G01N 15/147
9,848,135 B2 * 12/2017 Geelen ................... H04N 23/50
9,857,222 B2 * 1/2018 Geelen .................. G01J 3/0208
10,180,398 B2 * 1/2019 Sinclair ............. G01N 15/1484
10,275,880 B2 * 4/2019 Barnes ...................... G06T 7/11
10,365,218 B2 * 7/2019 Santori ................ G01J 3/0229
10,371,622 B2 8/2019 Sharpe et al.
10,386,300 B2 * 8/2019 Wu .................... G01N 21/6458
10,513,679 B2 * 12/2019 Tabata ............... G01N 15/1459
10,591,417 B2 * 3/2020 Santori ..................... G01J 3/18
10,648,860 B2 * 5/2020 Kang .................... G01J 3/0205
10,657,640 B2 * 5/2020 Dekel-Klein ......... G06F 18/211
10,740,884 B2 * 8/2020 McCall ..................... G06T 7/62
10,802,230 B2 * 10/2020 Kim ..................... G02B 6/4249
10,813,563 B2 * 10/2020 Sund, Sr. .................. G06T 5/20
10,919,074 B2 * 2/2021 Mårtensson ........... B05D 1/202
10,920,340 B2 * 2/2021 Alcott ............... C23C 16/45504
11,016,017 B2 * 5/2021 Lo ......................... G01J 3/0229
11,123,137 B2 * 9/2021 Uusimaa .............. A61B 18/203
11,169,084 B2 * 11/2021 Marshall ............ G01N 21/3577
11,262,239 B2 3/2022 Peumans et al.
11,295,152 B2 * 4/2022 Kurtoglu .............. G06V 10/141
11,360,083 B2 * 6/2022 Linke ................... G01N 21/645
11,364,520 B2 * 6/2022 Mårtensson ........... B82Y 40/00
11,490,961 B2 * 11/2022 Vilokkinen .......... A61B 5/0071
11,686,664 B2 * 6/2023 Govyadinov .......... G01N 15/02 204/193
11,702,761 B2 * 7/2023 Alcott .................. C30B 25/025 117/205
11,709,136 B2 * 7/2023 York .................. G01N 21/6445 250/459.1
11,786,115 B2 * 10/2023 Baumann ........... G02B 27/0068 348/68
11,841,495 B2 * 12/2023 Ryu ...................... G06T 7/0012
11,852,842 B2 * 12/2023 Parker ................ G02B 27/4233
12,059,230 B2 * 8/2024 Strano .................. A61B 5/7203
12,061,151 B2 * 8/2024 Frese ..................... G01N 21/65
12,078,585 B2 * 9/2024 Tenera Morgado .. G01J 3/2823
12,098,425 B2 * 9/2024 Daugharthy ........... G16B 99/00
12,134,096 B2 * 11/2024 Kenyon ............ G01N 15/1459
12,161,411 B2 * 12/2024 Frisken ................ A61B 3/1025
12,196,679 B2 * 1/2025 Cutrale ................ A61B 5/0075
2002/0102595 A1 * 8/2002 Davis ................... C12Q 1/6869 435/6.12
2003/0198963 A1 * 10/2003 Leonard ............... G01N 21/645 422/82.05
2004/0061914 A1 * 4/2004 Miyawaki ............ G02B 21/082 359/1
2005/0029464 A1 * 2/2005 Babayoff ............ G02B 21/008 250/370.08
2005/0275847 A1 * 12/2005 Moshe ...................... G01J 3/02 356/456
2006/0159916 A1 * 7/2006 Dubrow ............... B01J 20/3219 428/401
2006/0269927 A1 * 11/2006 Lieber .................. C12Q 1/6825 435/6.12
2007/0196043 A1 * 8/2007 Peled .................. G01N 21/774 385/12
2008/0121790 A1 * 5/2008 Grier .................... G03H 1/2294 359/9
2008/0149944 A1 * 6/2008 Samuelson ......... H01L 29/0673 257/88
2008/0241938 A1 * 10/2008 Rea ........................ B82Y 30/00 422/68.1
2008/0241951 A1 * 10/2008 Battulga ............. G01N 21/648 422/68.1
2009/0004471 A1 * 1/2009 Amthor .................. A61B 5/388 428/375
2009/0195773 A1 * 8/2009 Bassler .................. G01N 21/05 356/73
2009/0309049 A1 * 12/2009 Van Dijk .................. G01J 3/10 250/236
2010/0079857 A1 * 4/2010 Sasaki .................... G02B 21/16 359/388
2010/0201988 A1 * 8/2010 Kiesel .................... G01N 21/05 250/573
2010/0220315 A1 * 9/2010 Morrell ............. G01N 15/1436 356/73
2010/0314554 A1 * 12/2010 Galimberti ......... G01N 21/6458 359/566
2011/0189783 A1 * 8/2011 Andrew ............... G02B 6/1226 977/890
2012/0045748 A1 * 2/2012 Willson ............... C12Q 1/6804 435/6.12
2012/0061590 A1 * 3/2012 Khojasteh ............ G02B 21/367 356/405
2012/0069344 A1 * 3/2012 Liu ........................ G02B 5/008 356/450
2012/0156714 A1 * 6/2012 O'Brien ............. G01N 21/6428 435/29
2012/0250025 A1 * 10/2012 Moshe ................... G01N 21/85 356/451
2012/0307247 A1 * 12/2012 Tan ....................... G02B 21/16 356/445
2013/0100525 A1 * 4/2013 Chiang .................. G02B 27/58 359/385
2013/0329270 A1 * 12/2013 Nielsen .................. G02B 27/10 359/615
2015/0024507 A1 * 1/2015 Han .................. G01N 33/5438 422/69
2015/0145981 A1 * 5/2015 Anhut ................ G01N 21/6458 348/80
2016/0153910 A1 6/2016 Fujii et al.
2016/0202178 A1 * 7/2016 Acosta ................... G01N 21/27 356/302
2016/0299060 A1 * 10/2016 Hokanson .............. G01N 21/31
2017/0089837 A1 * 3/2017 Matsumoto ............ G01B 9/021
2017/0154420 A1 * 6/2017 Barnes ....................... G06T 7/11
2017/0176338 A1 * 6/2017 Wu .................... G01N 21/6428
2017/0212106 A1 * 7/2017 Linke ............... G01N 33/54373
2018/0031480 A1 * 2/2018 Sinclair ............. B01L 3/502761
2018/0052313 A1 * 2/2018 Hamilton ............... G02B 21/30
2018/0259318 A1 * 9/2018 Yelin ......................... G01B 9/04
2019/0064456 A1 * 2/2019 Kim ..................... G02B 6/4206
2019/0076192 A1 * 3/2019 Vilokkinen ........... H01S 3/1305
2019/0223953 A1 * 7/2019 Uusimaa .............. A61N 5/0616

(56) References Cited

U.S. PATENT DOCUMENTS

| | | | | |
|---|---|---|---|---|
| 2019/0226834 | A1* | 7/2019 | Lundquist | F17D 5/06 |
| 2019/0285545 | A1 | 9/2019 | Nagai et al. | |
| 2020/0279383 | A1* | 9/2020 | Kurtoglu | G01N 21/88 |
| 2020/0337769 | A1* | 10/2020 | Vilokkinen | A61N 5/062 |
| 2020/0378830 | A1* | 12/2020 | Gratton | G01J 3/4406 |
| 2021/0130979 | A1* | 5/2021 | Alcott | C30B 25/005 |
| 2021/0237117 | A1* | 8/2021 | Mårtensson | H10K 71/191 |
| 2021/0255089 | A1* | 8/2021 | Norton | G01N 15/1434 |
| 2022/0276250 | A1 | 9/2022 | Yasuda | |
| 2022/0297121 | A1 | 9/2022 | Appleyard et al. | |
| 2022/0341924 | A1* | 10/2022 | Linke | B01L 3/502715 |
| 2023/0040869 | A1* | 2/2023 | Alanko | A61B 18/20 |
| 2023/0041277 | A1* | 2/2023 | Uusimaa | A61N 5/062 |
| 2023/0092749 | A1* | 3/2023 | Cutrale | G01N 21/6428 250/459.1 |
| 2023/0178369 | A1* | 6/2023 | Borgström | H01L 21/02543 438/478 |
| 2023/0221178 | A1* | 7/2023 | Uusimaa | G01J 3/0208 250/205 |
| 2023/0221251 | A1* | 7/2023 | Uusimaa | G01N 21/6486 250/459.1 |
| 2024/0058753 | A1* | 2/2024 | Astier | C12Q 1/6806 |
| 2024/0254425 | A1* | 8/2024 | Nassef | C12M 41/46 |
| 2024/0410818 | A1 | 12/2024 | Alsheimer et al. | |

OTHER PUBLICATIONS

West et al., "Commercial Snapshot Spectral Imaging: The Art of the Possible";MITRE Technical Report;2018 (Year: 2018).*

Li et al.., "Snapshot hyperspectral retinal imaging using compact spectral resolving detector array";J Biophotonics. Jun. 2017 ; 10(6-7): 830-839. doi: 10.1002/jbio.201600053. (Year: 2017).*

Sun et el, Mosaic-Detector-Based Fluorescence Spectral Imager, NasaTech Briefs, Dec. 2007 (Year: 2007).*

English Machine Translation of CN-111141713-A (Year: 2020).*

European Patent Office, International Search Report, Application No. PCT/fi2023/050027, Mailed Apr. 18, 2023, 4 pages.

European Patent Office, International Search Report, International Application No. PCT/FI2023/050025, Mailed Apr. 14, 2023, 4 pages.

U.S. Appl. No. 17/753,404, Non Final Office Action mailed Sep. 28, 2023, 13 pages.

Dittrich et al., "Multispectral Imaging Flow Cytometry with Spatially and Spectrally Resolving Snapshot-Mosaic Cameras for the Characterization and Classification of Bioparticles" MDPI Micromachines, https://doi.org/10.3390/mi13020238, Published Jan. 31, 2022, 13 pages.

Kraus et al., "Multispectral imaging flow cytometry for process monitoring in microalgae biotechnology" Published 2022, 14 pages.

United States Patent and Trademark Office, Final Office Action, U.S. Appl. No. 17/573,404, Notification Date Apr. 25, 2024, 13 Pages.

United States Patent and Trademark Office, Notice of Allowance and Fee(s) Due, U.S. Appl. No. 17/573,404, mailed Jun. 26, 2025, 13 pages.

European Patent Office, Communication pursuant to Article 94(3) EPC, Application No. 237003124, Mailed Sep. 2, 2025, 6 pages.

* cited by examiner

APPARATUS AND A METHOD FOR FLUORESCENCE IMAGING

TECHNICAL FIELD

Various example embodiments generally relate to the field of fluorescence imaging. In particular, some example embodiments relate to an apparatus configured for fluorescence excitation and detection and a method thereof.

BACKGROUND

Hyperspectral flow cytometry imaging enables acquisition of hyperspectral images when performing flow cytometrical analysis. The hyperspectral images may be used, for example, for optical analysis and characterization of single-cells and other particles. Acquired spectral information, signalizing of the cell's material composition, can be collected along with spatial information in the form of spectral images. However, optimal excitation for the imaging may be difficult to achieve, and data analysis can be complicated due to multiple overlapping absorption and fluorescence emission bands of the target. It would be beneficial to improve imaging of biomedical samples to alleviate at least some of these drawbacks.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect, an apparatus for fluorescence imaging is provided. The apparatus may comprise at least one narrow linewidth excitation light source configured to provide a beam for fluorescence excitation at an excitation region located at an optical path of the beam; at least one optical guiding component configured to guide fluorescence light generated by the beam at the excitation region to an image sensor for hyperspectral imaging; and at least one image sensor comprising a spectral filtering component, the at least one image sensor configured to perform hyperspectral imaging based on the fluorescence light received via the at least one optical guiding component.

In an embodiment, the at least one narrow linewidth excitation light source, the at least one optical guiding component and the at least one image sensor are arranged on a same side with respect to a sample holder comprising the excitation region such that the optical path of beam differs from an optical path of the fluorescence light received by the image sensor.

In an embodiment, in addition or alternatively, the apparatus may further comprise at least one optical focusing component positioned between the at least one narrow linewidth excitation light source and the excitation region and configured to focus the beam on the excitation region.

In an embodiment, in addition or alternatively, the apparatus may further comprise at least one bandpass filter positioned between the at least one narrow linewidth excitation light source and the excitation region, and configured to filter the beam into monochromatic light.

In an embodiment, in addition or alternatively, the bandpass filter is configured to limit spectral bandwidth of the beam to or below 1 nm.

In an embodiment, in addition or alternatively, the apparatus may further comprise at least one beam-shaping component positioned between the narrow linewidth excitation light source and the optical focusing component, and configured to adjust at least one of a shape or a size of the beam.

In an embodiment, in addition or alternatively, the apparatus may further comprise at least one beam-shaping component positioned between the optical focusing component and the excitation region, and configured to adjust at least one of a shape or a size of the beam.

In an embodiment, in addition or alternatively, the optical focusing component is configured based on at least one of a material at the excitation region, geometrical design of the material or a distance between the optical focusing element and the excitation region.

In an embodiment, in addition or alternatively, a position of the optical guiding component is determined based on at least one of material at the excitation region, geometrical design of the material, a distance between the second optical focusing component and the excitation region, magnification properties of the optical guiding component or a numerical aperture of the optical guiding component.

In an embodiment, in addition or alternatively, the apparatus may comprise a plurality of narrow linewidth excitation light sources configured to provide beams for fluorescence excitation at two or more excitation regions; and the optical guiding component is configured for guiding fluorescence light generated by the beams at the two or more excitation regions to different image sensors.

In an embodiment, in addition or alternatively, the apparatus may comprise at least one narrow linewidth excitation light source configured to provide one or more beams for fluorescence excitation at one or more excitation regions; and wherein the at least one narrow linewidth excitation light source comprises at least one of a single-frequency laser or a laser diode that have less than 1 nm spectral bandwidth.

In an embodiment, in addition or alternatively, the at least one narrow linewidth excitation light source is configured to be wavelength tuneable.

In an embodiment, in addition or alternatively, the apparatus may comprise at least one optical beam splitting component configured to split the fluorescence light according to a wavelength of the fluorescence to a first image sensor configured to receive the fluorescence light of a first wavelength and a second image sensor configured to receive the fluorescence light of a second wavelength.

In an embodiment, in addition or alternatively, the apparatus may further comprise a mirroring component configured to guide the fluorescence light of the second wavelength to the second image sensor.

In an embodiment, in addition or alternatively, the apparatus may comprise a plurality of narrow linewidth excitation light sources configured to operate simultaneously or with temporal separation.

According to a second aspect, a method is provided. The method may comprise providing, by at least one narrow linewidth excitation light source, a beam for fluorescence excitation at an excitation region located at an optical path of the beam; guiding, by at least one optical guiding component, fluorescence light generated by the beam at the excitation region to an image sensor for hyperspectral imaging; and performing hyperspectral imaging, by at least one image sensor comprising a spectral filtering component, based on the fluorescence light received via the at least one optical guiding component.

In an embodiment, the method may comprise arranging the at least one narrow linewidth excitation light source, the at least one optical guiding component and the at least one image sensor on a same side with respect to a sample holder comprising the excitation region such that the optical path of beam differs from an optical path of the fluorescence light received by the image sensor.

In an embodiment, in addition or alternatively, the method may comprise configuring a plurality of narrow linewidth excitation light sources to provide beams for fluorescence excitation at two or more excitation regions; and configuring the optical guiding component to guide the fluorescence light generated by the beams at the two or more excitation regions to different image sensors. Further features of the method may result from the features of the apparatus according to the first aspect.

Many of the attendant features will be more readily appreciated as they become better understood by reference to the following detailed description considered in connection with the accompanying drawings.

BRIEF DESCRIPTION OF THE DRAWINGS

The accompanying drawings, which are included to provide a further under-standing of the example embodiments and constitute a part of this specification, illustrate example embodiments and together with the description help to explain the example embodiments. In the drawings.

Figure 1:
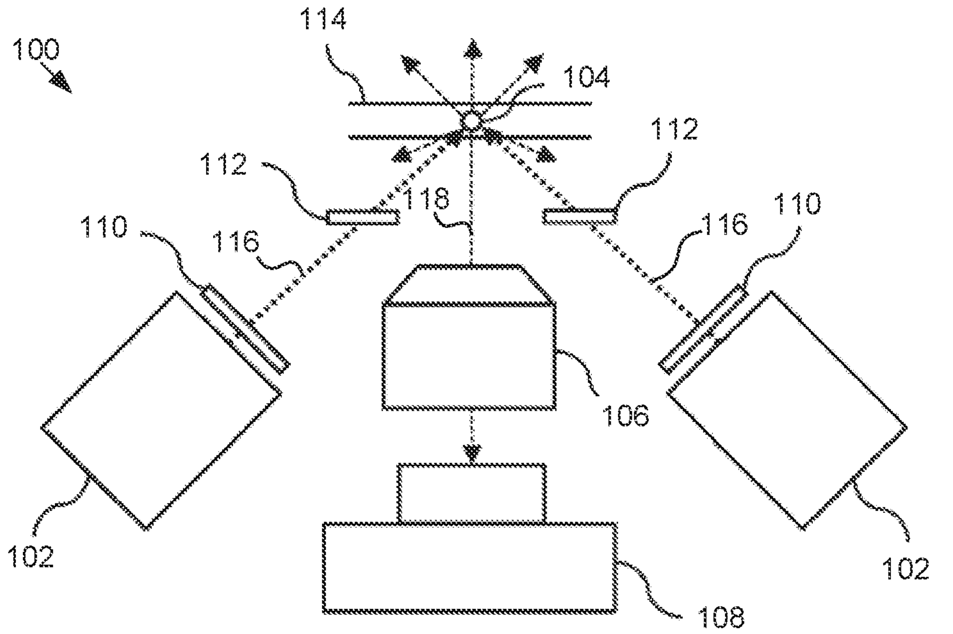
FIG. 1 illustrates an example of an apparatus for fluorescence imaging according to an example embodiment.

Like references are used to designate equivalent or at least functionally equivalent parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of operations for constructing and operating the example. However, the same or equivalent functions and sequences may be accomplished by different examples.

An embodiment may be configured to provide improved snapshot hyperspectral imaging for biological samples comprising fluorophores or producing auto-fluorescence or self-fluorescence under illumination without a fluorophore. An apparatus and a method are provided accordingly, wherein a combination of narrow linewidth excitation and spectrally-resolving detection approaches may allow to achieve high-quality and high-information-content hyperspectral data from an examined specimen. For example, the apparatus may be configured to implement snapshot hyperspectral imaging for flow cytometry. Hence, the information content obtained in flow cytometry analysis may be increased. The apparatus may be also configured to resolve spatial spectral information in analysing other fluorescence labelled or auto-fluorescing biological samples, like RNA or DNA analysis or sequencing, or cell or tissue samples, or biopsies, that are stained for pathological diagnosis of cancer or other diseases. The apparatus can further be used to substitute a plurality of biological tests performed to obtain the same information.

Flow cytometry is a technique used to detect and measure physical and chemical characteristics of a population of cells or particles. In flow cytometry, a sample constituting of cells or particles may be suspended in a fluid and injected into a flow cytometer instrument, such as a microcapillary channel.

Fluorescence labelling may be used for DNA and RNA sequencing to enable easier and faster sequencing. For example, the order of nucleotides of the DNA may be determined based on a unique fluorescence emission profile of four nucleotides. The sequencing of the DNA may be carried out on a glass plate or flow cell excited with laser light, for example.

Optical biopsy may refer to a technique to assess different pathological conditions, particularly of cancer, with tissue or blood as sample. For example, in the case of cancer the biochemistry and biophysics of the cells of tissue may undergo significant changes, which may be highly fluorescent. The difference in the concentration and distribution of these fluorophores may be monitored, for example, by spectral features and/or by excited state decay times by fluorescence imaging.

A fluorophore is a fluorescent chemical compound that can re-emit light upon light excitation. In other words, a fluorophore may absorb light energy of a specific wavelength and re-emit light at a longer wavelength. Fluorescence may refer to the light emitted by the fluorophore. A fluorophore marker may refer to a fluorophore serving as a marker for affine or bioactive reagents, for example, to stain cells or materials in a variety of analytical methods including fluorescence imaging. Biological samples may also produce fluorescence signal without a fluorophore, called auto-fluorescence, when irradiated with light having high enough energy to excite some molecules of the cells or tissue themselves. In fluorescence imaging, fluorescence is used to study properties of organic or inorganic substances.

Hyperspectral imaging may be used to collect and process data from across an electromagnetic spectrum. In hyperspectral imaging, the spectrum may be obtained for each pixel in an image in order to identify materials or ongoing processes, for example. In snapshot hyperspectral imaging, hyperspectral images may be captured during a single integration time of a detector array. For example, a focal-plane array may be used to generate an image in an instant.

In a system for flow cytometry, a flow cell may be positioned between an excitation and detection parts of the flow cytometry system. Flow cells may refer to samples cells, wherein liquid samples may be continuously flowed through a beam path for fluorescence excitation. Liquid samples may be focused along the flow path via various focusing means to provide precise interference points between the sample and the excitation source. A beam path may refer to an optical path or optical axis of a beam. For example, flow cells may be used for samples that can be damaged by a light source. In flow cells, new samples may be continuously replenished so that the damage does not interfere with the analysis. Flow cells are also useful in situations where samples need to vary continuously, such as gradually changing concentration amounts. When the flow cell is positioned between the excitation and detection parts, a used optical system may depend on a flow cell geometry. The detection part of such system may be designed to detect a presence or absence of a studied fluorophore (quantitative data). However, the detection part may not provide data on fluorophores distribution (qualitative data) within the studied cell. Thus, while the analysis may be fast, enabling higher throughput of the system, the information content of the data may be limited. Further, when a biological sample is illuminated from one side and fluorescence is detected directly from the other side, a lot of excitation light is allowed to be either transmitted or reflected onto the detector. In such configuration, most of the light hitting the detector or fluorescence collection optics can be, in fact, excitation light, producing noise in the detected signal. Filtering this unwanted light may not allow differentiating extremely weak fluorescence signals from the background noise. Similar quality and processing speed challenges may occur also with imaging static biological samples, like RNA or DNA in a flow cell or cells or tissue on a glass slide or a microscope slide prepared for fluorescence microscopy. Glass/microscope slides may be used to hold a specimen for examination, wherein the specimen may be placed between two thin sheets of glass.

Broad bandwidth excitation light sources (e.g., LEDs or halogen lamps) in combination with multispectral detector approaches may be used for multispectral imaging flow cytometry. Broad bandwidth excitation light sources may be light sources that produce light across a wide range of wavelengths, as opposed to monochromatic light sources, which may produce only a single wavelength or color of light. However, the broad bandwidth excitation light sources may not provide optimal excitation conditions. The broad bandwidth excitation light sources may introduce additional noise to the multispectral detector, as most of the wavelengths present in broad bandwidth light are not used for fluorophore excitation. For example, the broadband excitation light sources may cause a lot of excessive reflected light, which may blur the images and lead to information loss. Having a single broadband excitation source in an imaging system may lead to a simpler geometrical arrangement, but it may also lead to the trade-off in image quality. Thus, data analysis may be complicated because subtraction of unwanted signal may be needed. Further, the multispectral system using broad bandwidth excitation light source may require additional filtering. Moreover, light intensity in LEDs is distributed unevenly through the different wavelengths. Hence, LEDs may not be manually adjusted for each separate wavelength of interest. Consequently, a high signal level required by some fluorophores for optimal excitation may not be achieved or may be completely missed due to dominating one fluorescence process over any other when using broadband illumination.

An objective is to improve efficiency and compactness of an apparatus for fluorescence imaging. An example embodiment enables improving functionality of a detection part for hyperspectral imaging to enable simultaneous collection of spatial and spectral information of a specimen. The hyperspectral detection approach may be used in combination with individually adjustable narrow linewidth illumination which aims to provide more precise excitation of spectrally narrow transitions in fluorophores. This may lead to more efficient fluorophores excitation and image capturing. Hence, high-quality data may be provided for subsequent hyperspectral analysis. Optical modules of the apparatus may be positioned such that optical axes of excitation light and imaging are located on a same side with respect to a location of the specimen. Hence, an improved formfactor may be achieved with the geometrical design of the apparatus while improving quality of fluorescence imaging. Possible applications include clinical diagnostic tests and samples screening for RNA or DNA sequencing, or direct RNA and DNA sequencing or cell and tissue biopsy pathology.

FIG. 1 illustrates an example of an apparatus 100 for fluorescence imaging according to an example embodiment. The apparatus 100 may be configured for fluorescence excitation and detection. The apparatus 100 may be configured, for example, for flow cytometry, DNA sequencing, RNA sequencing or optical biopsy.

The apparatus 100 may comprise at least one narrow linewidth excitation light source 102. A narrow linewidth excitation light source may refer to a single-frequency light source with a narrow optical emission spectrum. For example, the narrow linewidth excitation light source 102 may be configured to emit laser light. The narrow linewidth excitation light source 102 may be configured to emit, for example, a single-mode laser beam with a circular Gaussian profile. The at least one narrow linewidth excitation light source 102 may be configured to provide one or more beams for fluorescence excitation at an excitation region 104. The beam for fluorescence excitation may also be referred to as an excitation beam. The apparatus 100 may be configured to provide the one or more beams, for example, as pulsed excitation light and/or in certain sequencies over time. The at least one narrow linewidth excitation light source 102 may also be configured to provide one or more beams for fluorescence excitation at more than one excitation regions 104. The at least one narrow linewidth excitation light source 102 may comprise, for example, a single-frequency laser. In addition, or alternatively, the at least one narrow linewidth excitation light source 102 may comprise, for example, a laser diode. The single-frequency laser and the laser diode may be configured to have less than 1 nm spectral bandwidth. Further, the at least one narrow linewidth excitation light source 102, such as the single-frequency laser and the laser diode, may be configured to be wavelength tuneable.

The apparatus 100 may comprise a plurality of narrow linewidth excitation sources 102 configured to provide one or more beams for fluorescence excitation at one or more excitation regions 104. Hence, multiple narrow linewidth excitation sources 102 may be configured to provide excitation light at the same excitation region 104. Alternatively, multiple narrow linewidth excitation sources 102 may be configured to provide excitation light at different excitation regions 104. The one or more narrow linewidth excitation sources 102 may comprise, for example, a fixed-wavelength or a wavelength-tunable laser source, or a combination thereof. The one or more narrow excitation sources 102 may be configured for producing the excitation light with different pulse length and/or timing at one or more different excitation regions 104. With one or more pulsed excitation light sources, the apparatus 100 may be configured for time-separated fluorescence excitation and detection. The apparatus 100 may comprise, for example, two or more excitation light sources, as illustrated in FIG. 1. The two or more narrow linewidth excitation light sources 102 may be configured for having a different optical axis for excitation with respect to each other, each directed at least one of at a different excitation region 104 or at a same excitation region 104. The two or more excitation sources 102 may be configured to generate the excitation beam at the same time for imaging. The optical axis of an excitation light source 102 may be fixed or changeable (by translation and/or rotation) for any or all of the one or more narrow linewidth excitation light sources 102. The two or more narrow linewidth excitation light sources 102 may be positioned symmetrically around a detection part of the apparatus 100. The detection part of the apparatus 100 may comprise, for example, at least one image sensor and optics for guiding fluorescence light to the image sensor.

The apparatus 100 may be configured to perform fluorescence excitation and detection for a sample flowing through or sitting on the one or more excitation regions 104. The excitation region 104 may comprise one or more specimen of the sample. The specimen may comprise, for example, cells to be studied. The cells may be located in a buffer solution flowing through a flow channel 114, such as a microcapillary channel, which serves as a propagation medium for the studied cells containing fluorophores. One or more excitation regions 104 may be located at the flow channel 114. An excitation region may also be referred to as an observation region. The flow channel 114 may be part of the apparatus 100, or separate from the apparatus 100. However, the apparatus 100 may also be configured for measurement of stationary samples. Hence, instead of the flow channel 114, the one or more excitation regions may be located, for example, at a sample chamber, glass slides or microscope slides for the purpose of fluorescence excitation of the sample. A flow channel, a sample chamber, glass slides or microscope slides may be referred to as a sample container or a sample holder. The apparatus 100 may be configured to provide excitation light at the sample containing fluorophores, for example at a given pulsed wavelength. In response to the caused excitation at the sample, fluorescence light emission may take place. This fluorescence may be emitted in all directions from the sample. The emitted fluorescence may represent a point light source at the excitation region 104.

The detection part of the apparatus 100 and the at least one narrow linewidth excitation light source 102 may be positioned at a same side from the excitation region 104. Further, the position of the at least one narrow linewidth excitation light source 102 may be inclined with respect to the detection part such that optical path of the beam is non-parallel to an optical path of light guided for imaging by the image sensor. When the components are located at the same side, it may refer to a same side with respect to an axis determined based on a flowing direction of the samples, such as below the microcapillary channel.

The excitation beam may be collimated and/or focused, for example by using lenses. In general, the apparatus 100 may comprise an optical system for excitation between any or all of the excitation regions 104 and the corresponding narrow linewidth excitation light sources 102 for providing the excitation light to the excitation region 104. The optical system for excitation may also be part of the narrow linewidth excitation light source 102, for example integrated thereto, or separate therefrom. The optical systems for any or all different excitation regions 104 may be separate from each other. The optical system may comprise any of collimation, filtering and focusing optics for the excitation light.

For example, the apparatus 100 may comprise at least one bandpass filter 110 configured to filter the light emitted from the narrow linewidth excitation light source 102. The at least one bandpass filter 110 may be positioned between the one or more narrow linewidth excitation light sources 102 and the one or more excitation regions 104 along a respective optical axis of the excitation light. The optical axis may also be referred to as an optical path. The bandpass filter 110 may be also part of the narrow linewidth excitation source 102, for example integrated thereto. The bandpass filter 110 may be configured to provide improved monochromaticity. The monochromaticity may be beneficial in flow cytometry and other applications of fluorescence imaging, since energy required for an electron transition in fluorophores may have to match precise energy excitation values. The bandpass filter 110 may be configured to limit a spectral bandwidth of the excitation beam to 1 nm, preferably below 1 nm. Thus, the bandpass filter 110 may enable achieving improved fluorophore excitation by the excitation beam, wherein the spectral bandwidth may not exceed the 1 nm limit. When the spectral bandwidth is limited to 1 nm or below, it may make it easier for the excitation beam to hit certain molecular absorption lines. The bandpass filter 110 may enable the highest transmission of light at the desired excitation region 104 and filtering of the rest of the spectrum.

The apparatus 100 may comprise an optical focusing component 112, such as a focusing lens. The optical focusing component may be positioned between the one or more narrow linewidth excitation sources 102 and the one or more excitation regions 104 along a respective optical axis of the beam for fluorescence excitation. The optical focusing component 112 may be configured to focus the fluorescence excitation light provided by the beam on the excitation region 104. The optical focusing component 112 may be positioned, for example, after the bandpass filter 110 such that the filtered fluorescence excitation light is focused on the excitation region 104. Precise focusing on an imaged area, i.e., the excitation region 104, may enable to avoid power losses and excessive excitation of the fluorophore, which might damage the sample, such as the studied cell. The optical focusing component 112 may be selected based on parameters comprising at least one of a material of the sample, a geometrical design of the sample, and/or a distance between the optical focusing component 112 and the excitation region 104.

Each of the narrow linewidth excitation light sources 102 may be associated with a dedicated optical system for excitation, such as comprising the bandpass filter 110 and optical focusing element 112. Alternatively, two narrow linewidth excitation light sources 102 may be coupled into a same waveguide or to an optical fiber on the same optical axis. The two or more narrow linewidth excitation sources 102 may be configured to provide excitation beams having different wavelengths. A waveguide may be configured to support the propagation of both wavelengths entering it. An example of a waveguide is an optical fibre designed to support propagation of different wavelengths or a photonic integrated circuit delivering or combining multiple wavelength light in waveguides produced for example by silicon dioxide or silicon nitride on a silicon. In this case, the bandpass filter 110 and the optical focusing element 112 may be configured to enable transmission of two or more excitation wavelengths.

The apparatus 100 may further comprise a beam-shaping component. The beam shaping component may be configured to correct a profile of the excitation beam when the profile does not meet beam shape requirements. The beam shape requirements may depend on, for example, properties of the sample. The beam-shaping component may be positioned to a location before the excitation beam is collimated by the optical focusing component 112. The beam-shaping component may be configured, for example, between the bandpass filter 110 and the focusing component 112. In addition, or alternatively, the beam-shaping component may be configured between the focusing component 112 and the excitation region 104. The beam-shaping component may comprise one or more cylindrical lenses. The beam-shaping component may comprise, for example, a diffractive optical element (DOE). The beam-shaping component may be configured to adjust a geometrical shape and/or size of the beam emitted by the narrow linewidth excitation light source 102. The geometrical shape may comprise any of a line, a rectangular, a square, or a circular shape, for example. The geometrical shape and/or size may be adjusted based on used flow cell parameters. The beam-shaping component may be also configured to correct the beam shape to obtain a multispot geometry if required by the application. A multispot geometry may refer to a pattern of multiple circular shapes. A single beam-shaping component may be configured to produce two or more beam shapes and/or beam sizes. Moreover, a combination of two or more beam-shaping components may be configured to provide further shape and/or size adjustment of the beam. Hence, performance of the apparatus 100 may be optimized. The beam-shaping component(s) and desired output may be defined by the flow cell arrangement, such as a material or a thickness of the sample. Thus, the beam-shaping components may be configured to be switchable to enable the apparatus 100 to be compatible with various flow cell designs.

The apparatus 100 may comprise an optical guiding component 106 for guiding the fluorescence light emitted from the excitation region 104 after receiving the excitation beam. The optical guiding component 106 may comprise one or more lenses. The optical guiding component 106 may comprise, for example, a microscope objective. For example, the microscope objective may be configured to collimate the emitted fluorescence light to guide the fluorescence light to an image sensor 108. The optical guiding component 106 may be selected based on parameters comprising at least one of a material of the sample, a geometrical design of the sample, a distance between the optical focusing component 112 and the excitation region 104, magnification properties and/or a numerical aperture (NA). Position of the optical guiding component 106 may be selected such that a major fraction of cells passing through a flow cell may be configured in focus when recorded by the image sensor 108.

The apparatus 100 may further comprise at least one image sensor 108. The image sensor 108 may be configured for hyperspectral imaging. The image sensor 108 may comprise, for example, a spectrally-resolving sensor. An example of a spectrally-resolving sensor is a spectrally resolving detection array (SRDA). The image sensor 108 may further comprise a spectral filter. The spectral filter may comprise, for example, a static pixelized filter or an adjustable dynamic filtering element. The spectral filter may be configured to have any mosaic-like geometry. The static pixelized filter may comprise, for example, a mosaic filter. An example of a mosaic filter may be a Fabry-Perot interference filter or a Bayer filter. The Fabry-Perot interference filter may be also known as an optical Fabry-Perot filter or a narrow band-pass filter. Geometry of the spectral filter can be that of Fabry-Perot (FP) interference filters, consisting of two highly reflective plates constituting a resonating cavity. Wavelength selectivity inside the resonating cavity may be achieved by multiple beam interferences. The FP filters may also be realized with adjustable resonance by electric field, for example, based on a liquid crystal layer (LCD) or a microelectromechanical system (MEMS). The FP filters may be directly applied on top of, for example, a CMOS (complementary metal-oxide-semiconductor) or a CCD (charge-couple device). For example, the apparatus 100 may be configured to cause the emitted fluorescence light to be imaged onto the SRDA sensor after filtering by a monolithic mosaic filter. The spectral filter may comprise a plurality of filters on top of the image sensor arranged in a mosaic like manner, so that data recorded by the plurality of filters with one wavelength can afterwards be combined to form a spectral sub image. The image sensor 108 may comprise, for example, a hyperspectral snapshot camera.

The apparatus 100 may be further configured to send the image data to an output device. The output device may comprise, for example, a display. The apparatus 100 may be further configured to send the image data to a computing device for analysis. The output device and the computing device may be external devices, or the apparatus 100 may comprise at least one of the devices.

Excitation and detection of fluorescence can be implemented in two ways. In a first approach, the apparatus 100 may be configured to generate spatially separated excitation beams on the microcapillary channel, leading to fluorescence image spatial separation on the image sensor, which allows selecting regions of interest. The regions of interest may comprise, for example, regions of intersection of excitation beams with the microcapillary channel, where the emission of fluorescence occurs. The apparatus 100 may be configured to cause data read-out from the selected regions of interest, which may increase frame per second rate of snapshot hyperspectral imaging. In the second approach, the apparatus 100 may be configured to generate spatially overlapping but temporally separated excitation beams. Such approach may permit hyperspectral imaging of a light-emitting particle synchronized with pulsed illumination during its movement along the microcapillary channel. This may allow the apparatus to record the hyperspectral images of the particle from non-overlapping pixels at different time moments with subsequent image reconstruction. Illumination du-ration and sensor exposure time of the apparatus 100 may be configured in accordance with light-emitting particle velocity and its emission intensity to decrease motion blur of the particle image.

The combination of the narrow bandwidth illumination based on excitation components of the apparatus 100 and multispectral imaging approach based on detection components of the apparatus 100 may provide improved conditions for high-quality imaging of biological cells or other particles of interest. The excitation components of the apparatus may comprise the one or more narrow linewidth excitation sources, the focusing component, the band-pass filter and/or the beam-shaping component. The detection components of the apparatus 100 may comprise to the optical guiding component and the image sensor.

On the detection side, employing the spectrally-resolving sensor such as the SRDA as a detector in the snapshot imaging scheme may allow to reduce the size of the apparatus 100. The size of the apparatus may be reduced since dispersing/scanning optical elements may not be needed. Instead, the image sensor may employ a mosaic filter which works as spectrally selective element for each detector pixel. Such configuration may allow obtaining spectral and spatial information at the same time, for example, to fill a spectral data cube. Further, design of the apparatus is simple as there may not be need for the dispersive or scanning elements. Another advantage is an amount of received detectable light emitted by the sample, which may be significantly decreased due to light loss in the dispersive optical elements.

The image sensor and the spectral filter of the apparatus may be selected based on the application. For example, a region of interest in flow cytometry may comprise a visible part of the spectrum (400-800 nm), since most of the fluorophores emit light in the region. Hence, in this case the image sensor may be configured for cytometrical applications to detect light in the region of 400-800 nm specifically. An increment in a number of spectral channels recorded by the image sensor may enable more precise detection of larger number of fluorophores. However, the increment in the number of the spectral channels may decrease the resolution of the images after a de-mosaicing process, since unless a size of the image sensor is increased, the lesser number of pixels may be used for composing an image of single bandwidth. The trade-off between quantity and quality may be thus optimised depending on the application. Alternatively, more than one image sensors may be used simultaneously for increasing the number of spectral channels without affecting the quality of the images.

Figure 2:
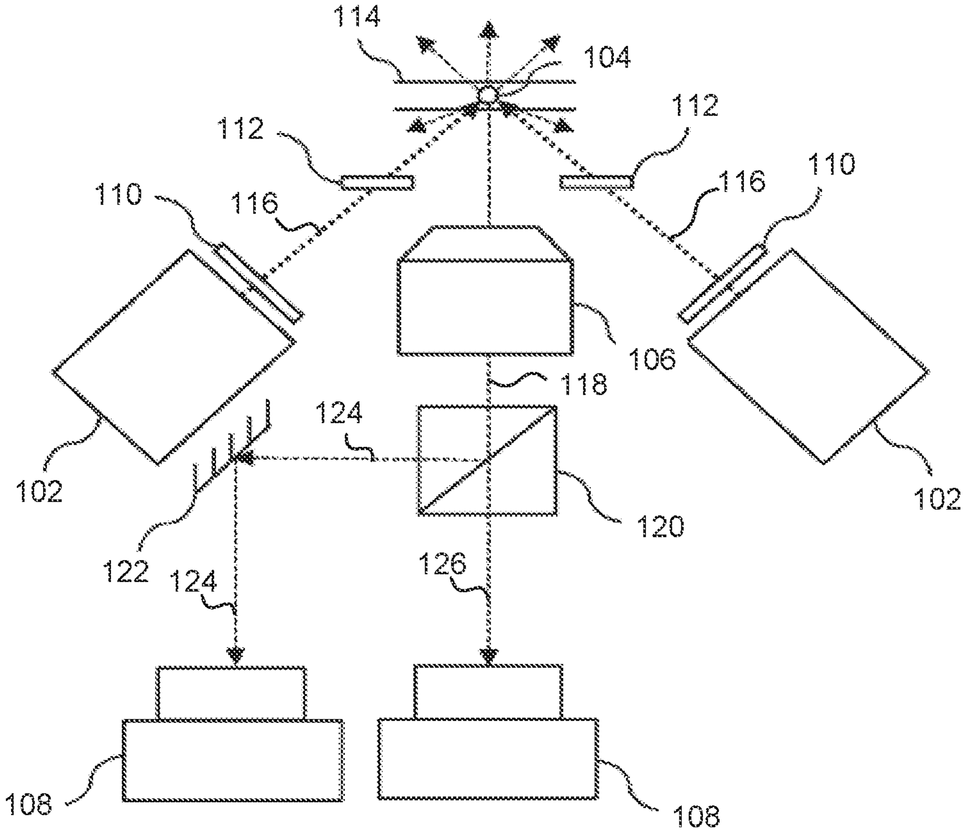
FIG. 2 illustrates an example of an apparatus for fluorescence imaging comprising a plurality of image sensors for hyperspectral imaging, according to an example embodiment.

FIG. 2 illustrates an example of an apparatus for fluorescence imaging comprising a plurality of image sensors for hyperspectral imaging, according to an example embodiment.

The apparatus 100 may comprise the at least one narrow linewidth excitation light source 102, the optical system for excitation comprising any or all of the bandpass filter 110, the optical focusing element 112 or the beam-shaping element, and an optical system for detection comprising the optical guiding component 106, as illustrated in FIG. 1. Therefore, details of the components already discussed are not repeated herein.

The optical system for detection may further comprise an optical beam splitting component 120 configured to split the fluorescence light into a transmitted beam 126 and a reflected beam 124. The optical beam splitting element 120 may be configured to split the fluorescence light according to its wavelength. The optical beam splitting component 120 may comprise, for example, two triangular glass prism which are attached together such that half of the fluorescence light incident through one side of the first prism is reflected through the first prism and the other half is transmitted through the second prism due to frustrated total internal reflection. Alternatively, the optical beam splitting component 120 may comprise for example a half-silvered mirror or a dichroic mirrored prism assembly. The optical beam splitting component 120 may be positioned between the optical guiding element 106 and a first image sensor 108.

The optical system for detection may further comprise at least one mirroring component 122, such as a mirror. The mirroring component(s) 122 may be configured to guide the reflected beam 124 to a second image sensor 108.

The apparatus 100 may comprise a plurality of image sensors 108. Although depicted with the first and the second image sensor receiving the transmitted 126 and reflected 124 light, the apparatus 100 may comprise more than two image sensors 108 by arranging a plurality of optical beam splitting components 120 and/or mirroring component 122 for guiding the fluorescence light to the plurality of image sensors 108. Each image sensor 108 may comprise a spectrally resolving sensor and a spectral filter. For example, any or all of the plurality of image sensors 108 may comprise a Fabry-Perot filter or a Bayer filter configured to convert complementary CMOS/CCD array into a respective SRDA. Alternatively, any existing or a future spectrally-resolving sensor and/or spectral filtering component may be part of the image sensor 108. In general, an operational principle of Fabry-Perot or Bayer filter may rely on Fabry-Perot resonance which is tuned to work as a spectral filter for a corresponding pixel in the CMOS/CCD array. Depending on the fluorophores of interest and optimal resolution, the image sensor 108 may enable resolving up to a few tens of spectral bands within a span of several hundreds of nm. The number of resolved spectral channels (spectral resolution) may be reversely proportional to the spatial resolution of the detector. As mentioned, this may lead to a trade-off between the number of spectral channels and resolution of the images after a de-mosaicing process. Hence, the apparatus 100 may comprise several SRDAs with mosaic filters designed to cover different spectral bands and configured to be used simultaneously in order to increase detectable spectral range of the hyperspectral imaging.

Instead of using a separate sensor for each wavelength detection, a separate image sensor may be used to cover different spectral regions. Thus, even despite the apparatus 100 may comprise a dispersive element such as a glass prism, the size of the apparatus 100 may be kept compact with a smaller amount of image sensors.

A geometrical arrangement of the apparatus 100 illustrated in FIGS. 1 and 2 may employ a geometry, where all the components of the apparatus 100 for excitation and detection are located on the same side with respect to the one or more excitation regions 104. In other words, the excitation region 104 may be located, for example, above or below each component of the apparatus 100. For example, each of the narrow linewidth excitation light source(s), the imaging sensor arrangement, and associated optical components may be located on a same side with respect to the flow channel 114, or in general a sample holder. Thus, the whole optical system provided by the apparatus 100 can be compatible with any flow cell design after focus calibration of the optical focusing component 112 and the optical guiding component 106. Further, the narrow linewidth excitation light sources 102 may be in an angled position in relation to the detection components of the apparatus 100. Hence, optical path of the excitation beam may differ from an optical path of the fluorescence light used for imaging. The narrow linewidth excitation sources 102 may be inclined, for example, such that an angle between the optical path 116 of the generated excitation beam is less than 90 degrees or less than 45 degrees with respect to the optical path 118, 124, 126 of the fluorescence light received by the image sensor 108. This enables, that the emitted or reflected excitation light may not cause information loss on the fluorescence imaging.

Figure 3:
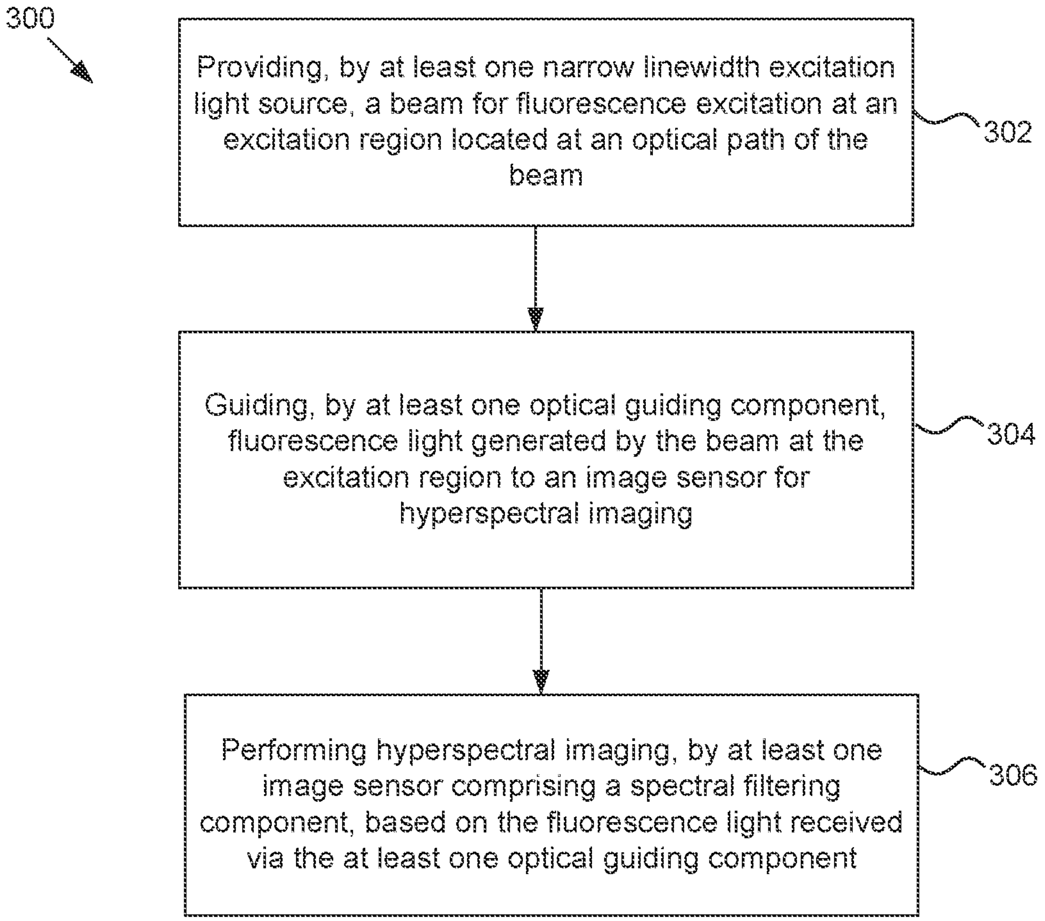
FIG. 3 illustrates an example of a method for fluorescence imaging according to example embodiment.

FIG. 3 illustrates an example of a method 300 for fluorescence imaging according to example embodiment. The method may be carried out, for example, by the apparatus 100.

At an operation 302, the method may comprise providing, by at least one narrow linewidth excitation light source, a beam for fluorescence excitation at an excitation region located at an optical path of the beam.

At an operation 304, the method may comprise guiding, by at least one optical guiding component, fluorescence light generated by the beam at the excitation region to an image sensor for hyperspectral imaging.

At an operation 306, the method may comprise performing hyperspectral imaging, by at least one image sensor comprising a spectral filtering component, based on the fluorescence light received via the at least one optical guiding component.

Further features of the method(s) directly result, for example, from functionalities of the apparatuses described throughout the specification and in the appended claims and are therefore not repeated here. Different variations of the method(s) may be also applied, as described in connection with the various example embodiments. It is obvious to a person skilled in the art that with the advancement of technology, the basic idea of the disclosure may be implemented in various ways. The disclosure and the embodiments are thus not limited to the examples described above, instead they may vary within the scope of the claims.

An apparatus may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus for fluorescence imaging, comprising:

at least one narrow linewidth excitation light source configured to provide a beam for fluorescence excitation at an excitation region located at an optical path of the beam;

at least one optical guiding component configured to guide fluorescence light generated by the beam at the excitation region to an image sensor for hyperspectral imaging; and at least one image sensor comprising a spectrally-resolving sensor and a static pixelized filter, the at least one image sensor configured to perform snapshot hyperspectral imaging to obtain spectral and spatial information at the same time based on the fluorescence light received via the at least one optical guiding component.

2. The apparatus of claim 1, wherein the at least one narrow linewidth excitation light source, the at least one optical guiding component and the at least one image sensor are arranged on a same side with respect to a sample holder comprising the excitation region such that the optical path of beam differs from an optical path of the fluorescence light received by the image sensor.

3. The apparatus of claim 2, wherein the bandpass filter is configured to limit spectral bandwidth of the beam to or below 1 nm.

4. The apparatus of claim 1, further comprising:

at least one optical focusing component positioned between the at least one narrow linewidth excitation light source and the excitation region and configured to focus the beam on the excitation region.

5. The apparatus of claim 1, further comprising:

at least one bandpass filter positioned between the at least one narrow linewidth excitation light source and the excitation region, and configured to filter the beam into monochromatic light.

6. The apparatus of claim 1, further comprising:

at least one beam-shaping component positioned between the narrow linewidth excitation light source and the optical focusing component, and configured to adjust at least one of a shape or a size of the beam.

7. The apparatus of claim 1, further comprising:

at least one beam-shaping component positioned between the optical focusing component and the excitation region, and configured to adjust at least one of a shape or a size of the beam.

8. The apparatus of claim 1, wherein the optical focusing component is configured based on at least one of a material at the excitation region, geometrical design of the material or a distance between the optical focusing element and the excitation region.

9. The apparatus of claim 1, wherein a position of the optical guiding component is determined based on at least one of material at the excitation region, geometrical design of the material, a distance between the second optical focusing component and the excitation region, magnification properties of the optical guiding component or a numerical aperture of the optical guiding component.

10. The apparatus of claim 1, wherein the apparatus comprises a plurality of narrow linewidth excitation light sources configured to provide beams for fluorescence excitation at two or more excitation regions; and the optical guiding component is configured for guiding fluorescence light generated by the beams at the two or more excitation regions to different image sensors.

11. The apparatus of claim 1, wherein the apparatus comprises at least one narrow linewidth excitation light source configured to provide one or more beams for fluorescence excitation at one or more excitation regions; and wherein the at least one narrow linewidth excitation light source comprises at least one of a single-frequency laser or a laser diode that have less than 1 nm spectral bandwidth.

12. The apparatus of claim 11, wherein the at least one narrow linewidth excitation light source is configured to be wavelength tuneable.

13. The apparatus of claim 11, further comprising a mirroring component configured to guide the fluorescence light of the second wavelength to the second image sensor.

14. The apparatus of claim 1, comprising:

at least one optical beam splitting component configured to split the fluorescence light according to a wavelength of the fluorescence to a first image sensor configured to receive the fluorescence light of a first wavelength and a second image sensor configured to receive the fluorescence light of a second wavelength.

15. The apparatus of claim 1, wherein the apparatus comprises a plurality of narrow linewidth excitation light sources configured to operate simultaneously or with temporal separation.

16. A method, the method comprising:

providing, by at least one narrow linewidth excitation light source, a beam for fluorescence excitation at an excitation region located at an optical path of the beam;

guiding, by at least one optical guiding component, fluorescence light generated by the beam at the excitation region to an image sensor for hyperspectral imaging; and performing snapshot hyperspectral imaging, by at least one image sensor comprising a spectrally-resolving sensor and a static pixelized filter, to obtain spectral and spatial information at the same time, based on the fluorescence light received via the at least one optical guiding component.

17. The method of claim 13, comprising:

arranging the at least one narrow linewidth excitation light source, the at least one optical guiding component and the at least one image sensor on a same side with respect to the a sample holder comprising the excitation region such that the optical path of beam differs from an optical path of the fluorescence light received by the image sensor.

18. The method of claim 13, comprising:

configuring a plurality of narrow linewidth excitation light sources to provide beams for fluorescence excitation at two or more excitation regions; and configuring the optical guiding component to guide the fluorescence light generated by the beams at the two or more excitation regions to different image sensors.

* * * * *